United States Patent
Nammi

(10) Patent No.: US 10,630,453 B2
(45) Date of Patent: Apr. 21, 2020

(54) FACILITATING RESTRICTION OF CHANNEL STATE INFORMATION TO IMPROVE COMMUNICATION COVERAGE IN 5G OR OTHER NEXT GENERATION NETWORKS

(71) Applicant: AT&T Intellectual Property I, L.P., Atlanta, GA (US)

(72) Inventor: SaiRamesh Nammi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 205 days.

(21) Appl. No.: 15/674,233

(22) Filed: Aug. 10, 2017

(65) Prior Publication Data
US 2019/0052441 A1 Feb. 14, 2019

(51) Int. Cl.
*H04W 72/00* (2009.01)
*H04L 5/00* (2006.01)
(Continued)

(52) U.S. Cl.
CPC .......... *H04L 5/0057* (2013.01); *H04L 1/0026* (2013.01); *H04L 1/1614* (2013.01);
(Continued)

(58) Field of Classification Search
CPC .. H04L 1/1614; H04L 5/0057; H04W 52/365; H04W 64/00; H04W 72/042; H04W 72/048
See application file for complete search history.

(56) References Cited

U.S. PATENT DOCUMENTS 7,813,272 B2   10/2010   Seki
7,885,202 B2    2/2011   Li et al.
(Continued)

FOREIGN PATENT DOCUMENTS

WO   2009076487 A1   6/2009
WO   2013022266 A2   2/2013
(Continued)

OTHER PUBLICATIONS

Chiumento, et al. "Adaptive CSI and feedback estimation in LTE and beyond: a Gaussian process regression approach." EURASIP Journal on WirelessCommunications and Networking Jan. 2015, 2015, 14 pages.
(Continued)

*Primary Examiner* — Khalid W Shaheed
(74) *Attorney, Agent, or Firm* — Amin, Turocy & Watson, LLP

(57) ABSTRACT

Facilitating restriction of channel state information is provided herein. A system can comprise a processor and a memory that stores executable instructions that, when executed by the processor, facilitate performance of operations. The operations can comprise setting a bit within a channel quality indicator bitmap as a function of a performance criterion of a mobile device. The bit can be selected from a group of bits within the channel quality indicator bitmap. Further, the operations can comprise sending the channel quality indicator bitmap to the mobile device. The bit can restrict a selection by the mobile device to defined channel quality indicator indices and can reduce a number of bits that represent the defined channel quality indicator indices.

20 Claims, 14 Drawing Sheets

(51) Int. Cl.
*H04L 1/16* (2006.01)
*H04W 64/00* (2009.01)
*H04W 52/36* (2009.01)
*H04W 72/04* (2009.01)
*H04L 1/00* (2006.01)
*H04B 17/309* (2015.01)
*H04B 17/27* (2015.01)

(52) U.S. Cl.
CPC ......... *H04W 52/365* (2013.01); *H04W 64/00* (2013.01); *H04W 72/042* (2013.01); *H04W 72/048* (2013.01); *H04B 17/27* (2015.01); *H04B 17/309* (2015.01); *H04L 1/0003* (2013.01); *H04L 1/0031* (2013.01); *H04L 5/0048* (2013.01)

(56) References Cited

U.S. PATENT DOCUMENTS

| | | | |
|---|---|---|---|
| 7,979,075 | B2 | 7/2011 | Cheng et al. |
| 8,265,016 | B2 | 9/2012 | Xu |
| 8,315,643 | B2 | 11/2012 | Li et al. |
| 8,611,259 | B2 | 12/2013 | Pi et al. |
| 8,630,184 | B2 | 1/2014 | Kim et al. |
| 9,042,328 | B2 | 5/2015 | Pajukoski et al. |
| 9,083,412 | B2 | 7/2015 | Han et al. |
| 9,571,175 | B2 | 2/2017 | Yang et al. |
| 9,681,325 | B2 | 6/2017 | Chen et al. |
| 9,692,580 | B2 | 6/2017 | Shen et al. |
| 9,867,199 | B1 * | 1/2018 | Pawar ............... H04W 72/0486 |
| 2009/0116570 | A1 | 5/2009 | Bala et al. |
| 2009/0225738 | A1 | 9/2009 | Xu et al. |
| 2012/0170525 | A1 * | 7/2012 | Sorrentino ............ H04L 5/0007 370/329 |
| 2013/0290758 | A1 * | 10/2013 | Quick ................... G06F 1/3203 713/323 |
| 2014/0112303 | A1 * | 4/2014 | Popovic ................ H04L 5/0044 370/330 |
| 2015/0030092 | A1 * | 1/2015 | Krishnamurthy .... H04B 7/0456 375/267 |
| 2016/0270094 | A1 * | 9/2016 | Dinan ................. H04W 52/325 |
| 2016/0278108 | A1 | 9/2016 | Tong et al. |
| 2017/0188255 | A1 | 6/2017 | Chandrasekhar et al. |
| 2017/0346545 | A1 * | 11/2017 | Islam .................... H01Q 1/245 |

FOREIGN PATENT DOCUMENTS

| | | |
|---|---|---|
| WO | 2013068974 A1 | 5/2013 |
| WO | 2014075458 A1 | 5/2014 |
| WO | 2014148964 A1 | 9/2014 |
| WO | 2017023230 A1 | 2/2017 |
| WO | 2017027057 A1 | 2/2017 |
| WO | 2017050273 A1 | 3/2017 |
| WO | 2017137109 A1 | 8/2017 |

OTHER PUBLICATIONS

Awal, et al. "Dynamic cqi resource allocation for ofdma systems." Wireless Communications and Networking Conference (WCNC), IEEE, 2011, 6 pages.

Becvar, et al. "Prediction of channel quality after handover for mobility management in 5G." 5G for Ubiquitous Connectivity (5GU), 1st International Conference on. IEEE, 2014, 5 pages.

* cited by examiner

| CQI Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | 0 | 1 | 1 | 0 | 0 | 0 | 0 | 0 | 0 | 0 | 0 | 0 | 0 | 0 | 0 | 0 |

FIG. 5

| CQI Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
|  | 0 | 1 | 1 | 1 | 0 | 0 | 0 | 1 | 0 | 0 | 0 | 0 | 0 | 0 | 0 | 0 |

FIG. 7

| CQI / Index Bit Setting | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
|  | 0 | 1 | 1 | 0 | 0 | 0 | 0 | 0 | 1 | 0 | 0 | 1 | 0 | 0 | 0 | 0 |

FIG. 11

FACILITATING RESTRICTION OF CHANNEL STATE INFORMATION TO IMPROVE COMMUNICATION COVERAGE IN 5G OR OTHER NEXT GENERATION NETWORKS

TECHNICAL FIELD

The subject disclosure relates generally to communications systems, and for example, to facilitating restriction of channel state information to improve communication coverage in 5G or other next generation networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which:

FIG. 5 illustrates an example, non-limiting channel quality indicator subset restriction bit map in accordance with one or more embodiments described herein;

FIG. 7 illustrates a CQI subset restriction bit map for a second example in accordance with one or more embodiments described herein;

FIG. 11 illustrates an example, non-limiting bitmap in accordance with one or more embodiments described herein;

DETAILED DESCRIPTION

Figure 1:
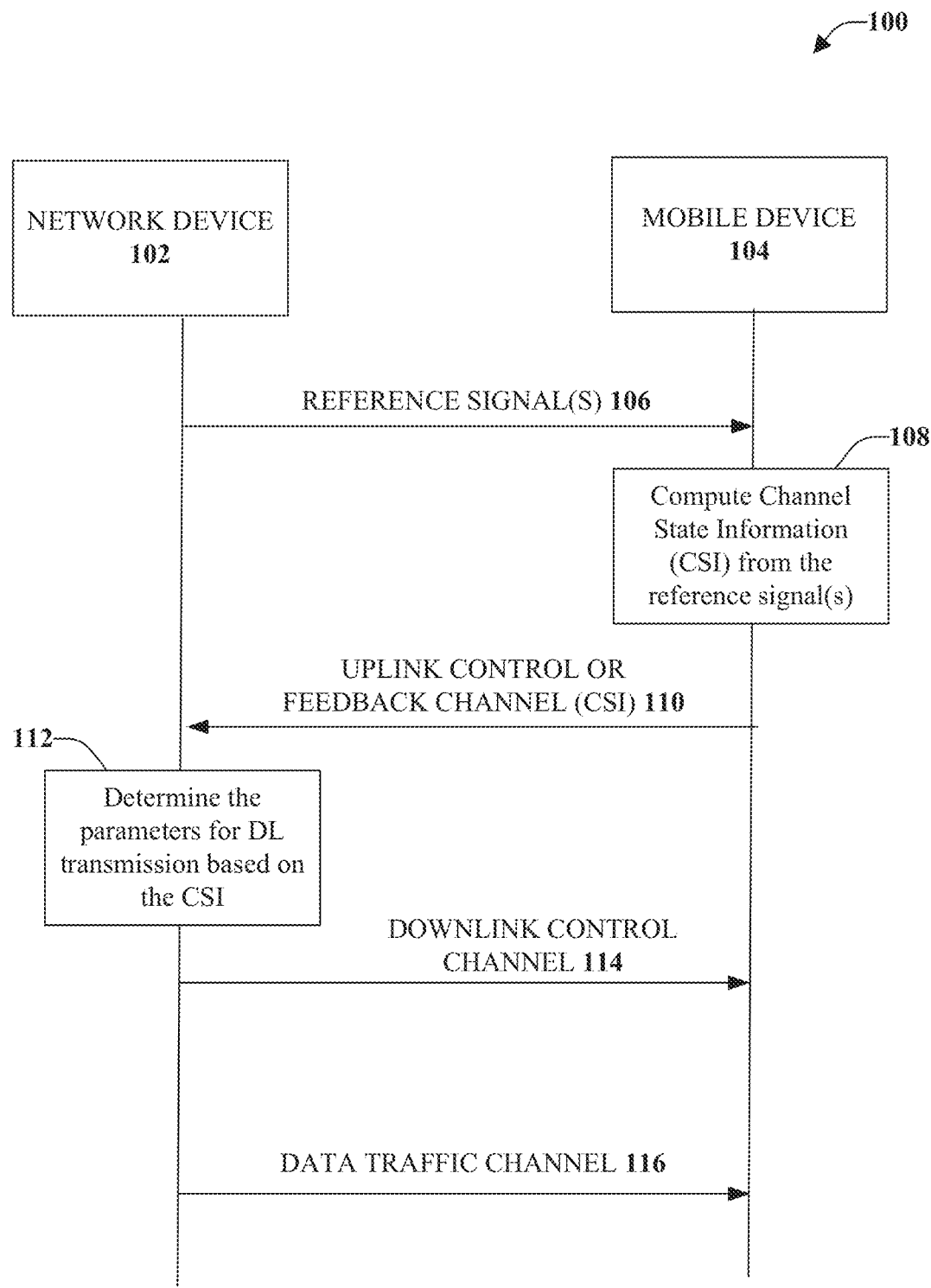
FIG. 1 illustrates an example, non-limiting message sequence flow chart that can facilitate downlink data transfer in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Discussed herein are various aspects that relate to facilitating restriction of channel state information to improve communication coverage in 5G or other next generation networks. For example, the various aspects are related to communication systems where the channel quality indicator (CQI) reported by the mobile device is controlled based on an indication provided by a network device. In an implementation, the indication can be provided by the network device in a bit map. The indication can include a CQI subset restriction, which can facilitate the transmission of compact control channel information by the mobile device. Accordingly, the mobile device can transmit a feedback channel by taking into consideration the CQI subset restriction. For example, the feedback channel (uplink and/or downlink) can scale according to the bit pattern set by the network device. According to some implementations, instead of the CQI, a modulation coding scheme (MCS) can be utilized to facilitate restriction of channel state information to improve communication coverage. Accordingly, any aspects discussed with respect to CQI are also applicable to MCS.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as New Radio (NR) access. Accordingly, systems, methods, and/or machine-readable storage media for facilitating improved communication coverage for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

In one embodiment, described herein is a system that comprises a processor and a memory that stores executable instructions that, when executed by the processor, facilitate performance of operations. The operations can comprise setting a bit of a channel quality indicator bitmap as a function of a performance criterion of a mobile device. The bit can be selected from a group of bits of the channel quality indicator bitmap. Further, the operations can comprise sending the channel quality indicator bitmap to the mobile device. The bit can restrict a selection by the mobile device to defined channel quality indicator indices and can reduce a number of bits that represent the defined channel quality indicator indices.

In an example, the operations can comprise selecting the bit from the group of bits of the channel quality indicator bitmap based on a determination of reporting channel quality indicator indices for use by the mobile device for channel state information reporting.

In another example, the operations can comprise determining a location of the mobile device within a coverage area associated with a wireless network. Further, to this example, the location of the mobile device can be used to set the defined channel quality indicator indices corresponding to quadrature phase shift keying.

According to another example, the operations can comprise determining a Doppler metric of the mobile device. Setting the bit can comprise setting a first bit of the channel quality indicator bitmap based on a first determination that the Doppler metric does not satisfy a defined threshold. Alternatively, setting the bit can comprise setting a second bit of the channel quality indicator bitmap based on a second determination that the Doppler metric satisfies the defined threshold.

In another example, the operations can comprise determining a receiving capability of the mobile device based on a number of transmit antennas. Further to this example, setting the bit can comprise setting a first bit of the channel quality indicator bitmap based on a first determination that the receiving capability of the mobile device is a two transmit antenna capability. Alternatively, setting the bit can comprise setting a second bit of the channel quality indicator bitmap based on a second determination that the receiving capability of the mobile device is a four transmit antenna capability The operations can further comprise, in another example, determining a power headroom capability of the mobile device. Further to this example, setting the bit can comprise setting a first bit of the channel quality indicator bitmap based on a first determination that the power headroom capability of the mobile device does not satisfy a defined power headroom level. Alternatively, setting the bit can comprise setting a second bit of the channel quality indicator bitmap based on a second determination that the power headroom capability of the mobile device does satisfy the defined power headroom level.

In an example, sending the channel quality indicator bitmap to the mobile device can comprise sending the channel quality indicator bitmap via a downlink control channel configured to operate according to a fifth generation wireless communication network protocol.

Another embodiment is method that can comprise setting, by a network device of a wireless network, a bit in a channel quality indicator bitmap based on a criterion associated with a mobile device. The network device comprises a processor. The method can also comprise facilitating, by the network device, a transmission of the channel quality indicator bitmap to the mobile device. The channel quality indicator bitmap can indicate channel quality indicator indices for channel state information reporting by the mobile device.

In an example, the criterion associated with the mobile device can be a location of the mobile device within a coverage area associated with the wireless network. Setting the bit in the channel quality indicator bitmap can comprise determining the location of the mobile device within a coverage area associated with the wireless network. Further, setting the bit can comprise setting the channel quality indicator indices corresponding to a quadrature phase shift keying.

According to another example, the criterion associated with the mobile device can be a Doppler metric of the mobile device. Further to this example, setting the bit in the channel quality indicator bitmap can comprise determining the Doppler metric of the mobile device. Further, setting the bit can comprise setting a first bit of the channel quality indicator bitmap based on a first determination that the Doppler metric does not satisfy a defined threshold. Alternatively, setting the bit can comprise setting a second bit in the channel quality indicator bitmap based on a second determination that the Doppler metric satisfies the defined threshold.

According to another example, the criterion associated with the mobile device can be a capacity of the mobile device. Setting the bit in the channel quality indicator bitmap can comprise determining a receiving capability of the mobile device based on a number of transmit antennas. Further setting the bit can comprise setting a first bit in the channel quality indicator bitmap based on a first determination that the receiving capability of the mobile device is a two transmit antenna capability. Alternatively, setting the bit can comprise setting a second bit in the channel quality indicator bitmap based on a second determination that the receiving capability of the mobile device is a four transmit antenna capability.

In another example, the criterion associated with the mobile device can be a power headroom of the mobile device. Further, to this example the method can comprise determining a power headroom capability of the mobile device. The method can also comprise setting a first bit in the channel quality indicator bitmap based on a first determination that the power headroom capability of the mobile device does not satisfy a defined power headroom level. Alternatively, the method can comprise setting a second bit in the channel quality indicator bitmap based on a second determination that the power headroom capability of the mobile device satisfies the defined power headroom level.

According to an example, facilitating the transmission of the channel quality indicator bitmap to the mobile device can comprise facilitating the transmission the channel quality indicator bitmap using a higher layer signaling. In accordance with another example, facilitating the transmission of the channel quality indicator bitmap to the mobile device can comprise facilitating the transmission of the channel quality indicator bitmap using a physical layer signaling. The physical layer signaling can reduce a latency as compared to a higher layer signaling. According to another example, facilitating the transmission of the channel quality indicator bitmap to the mobile device can comprise facilitating the transmission of the channel quality indicator bitmap using implicit signaling.

The channel quality indicator indices indicates, to the mobile device, a number of bits to be used by the mobile device to report the channel quality indicator indices. In an example, setting the bit in the channel quality indicator bitmap can comprise scaling a feedback channel structure based on a channel quality indicator subset restriction. In another example, the transmission is a first transmission and scaling the feedback channel structure can comprise facilitating a second transmission of compact control channel information.

According to yet another embodiment, described herein is a machine-readable storage medium comprising executable instructions that, when executed by a processor, facilitate performance of operations. The operations can comprise determining, based on a criterion of a mobile device, a bit of a modulation coding scheme bitmap to activate. The bit can be selected from two or more bits of the modulation coding scheme bitmap. The operations can also comprise sending to the mobile device the modulation coding scheme bitmap with the bit activated. The bit being activated specifies modulation coding scheme indices to be used by the mobile device to report channel state information.

In an example, sending the modulation coding scheme bitmap can comprise sending the modulation coding scheme bitmap via a downlink control channel configured to a defined radio access network protocol.

Referring initially to FIG. 1, illustrated is an example, non-limiting message sequence flow chart 100 that can facilitate downlink data transfer in accordance with one or more embodiments described herein. The non-limiting message sequence flow chart 100 can be utilized for new radio, as discussed herein. As illustrated, the non-limiting message sequence flow chart 100 represents the message sequence between a network device 102 and a mobile device 104. As used herein, the term "network device 102" can be interchangeable with (or include) a network, a network controller or any number of other network components. One or more pilot signals and/or reference signals 106 can be transmitted from the network device 102 to the mobile device 104. The one or more pilot signals and/or reference signals 106 can be beamformed or non-beamformed. According to some implementations, the one or more pilot signals and/or reference signals 106 can be cell (e.g., network device) specific and/or mobile device specific.

Based on the one or more pilot signals and/or reference signals 106, the mobile device 104 can compute the channel estimates and can determine (e.g., can compute) the one or more parameters needed for channel state information (CSI) reporting, as indicated at 108. The CSI report can comprise, for example, the CQI, a precoding matrix index (PMI), rank information (RI), the best subband indices, best beam indices, and so on, or any number of other types of information.

The CSI report can be sent from the mobile device 104 to the network device 102 via a feedback channel (e.g., uplink control or feedback channel 110). The CSI report can be sent on a periodic basis or on demand (e.g., aperiodic CSI reporting). The network device 102, which can comprise a scheduler, can use the CSI report for choosing the parameters for scheduling of the mobile device 104, as indicated at 112. The network device 102 can send the scheduling parameters to the mobile device 104 in a downlink control channel (e.g., downlink control channel 114), referred to as the Physical Downlink Control Channel (PDCCH). After the scheduling parameter information is transmitted, the actual data transfer can take place from the network device 102 to the mobile device 104 over the data traffic channel 116.

Downlink reference signals can be predefined signals occupying defined resource elements within the downlink time-frequency grid. There can be several types of downlink reference signals transmitted in different ways and used for different purposes by the receiving terminal. Such types of reference signals include CSI reference signals and demodulation reference signals.

CSI reference signals (CSI-RS) are signals that are intended to be used by terminals to acquire CSI and beam specific information (e.g., beam Reference Signal Received Power (RSRP)). According to an example, in 5G CSI-RS is mobile device specific and, therefore, the signal can have a significantly lower time/frequency density.

Demodulation reference signals (DM-RS) are sometimes referred to as mobile device specific (or User Equipment (UE)-specific) reference signals. The DM-RS are intended to be used by terminals for channel estimation for data channel. The label "UE-specific" relates to the fact that each demodulation reference signal is intended for channel estimation by a single terminal (or mobile device). That specific reference signal is then only transmitted within the resource blocks assigned for data traffic channel transmission to that terminal (e.g., mobile device).

Other types of reference signals can include, but are not limited to phase tracking reference signals, Multicast-Broadcast Single-Frequency Network (MBSFN) and positioning reference signals, which can be used for various purposes which are not relevant for the aspects discussed herein.

In NR, the uplink control channel can carry information about Hybrid Automatic Repeat Request-Acknowledgement (HARQ-ACK) information corresponding to the downlink data transmission, and channel state information. The channel state information can consists of Rank Indicator (RI), Channel Quality Indicator (CQI), and Precoding Matrix Indicators (PMI). Either Physical Uplink Control Channel (PUCCH) or Physical Uplink Shared Channel (PUSCH) can be used to carry this information. Note that the PUCCH reporting can be periodic and the periodicity of the PUCCH can be configured by the higher layers, while the PUSCH reporting can be aperiodic.

In NR, the downlink control channel (PDCCH) can carry information about the scheduling grants. This can include a number of Multiple Input, Multiple Output (MIMO) layers scheduled, transport block sizes, modulation for each codeword, parameters related to HARQ, sub band locations and also PMI corresponding to that sub bands.

The information that can be transmitted by means of the Downlink Control Information (DCI) format can include: Resource block assignment, modulation and coding scheme, HARQ process number, new data indicator, redundancy version, Transmit Power Control (TPC) command for PUCCH, number of layers, and beam pair index. It is noted that all the DCI formats might not be used to transmit all the information as discussed above.

The downlink control channel carries information about the scheduling grants. This can include a number of MIMO layers scheduled, transport block sizes, modulation for each codeword, parameters related to Hybrid Automatic Repeat Request (HARQ), sub band locations, and precoding matrix index corresponding to the sub bands.

Various information can be transmitted by means of the downlink control information (DCI) format. Such information can include: localized/distributed Virtual Resource Block (VRB) assignment flag, resource block assignment, modulation and coding protocol, HARQ process number, new data indicator, redundancy version, Transmission Power Control (TPC) command for uplink control channel, downlink assignment index, precoding matrix index, number of layers, transmitter beam information for data channel, Quasi Co-Location (QCL) condition, and/or Demodulation Reference Signal (DMRS) port information.

Figure 2:
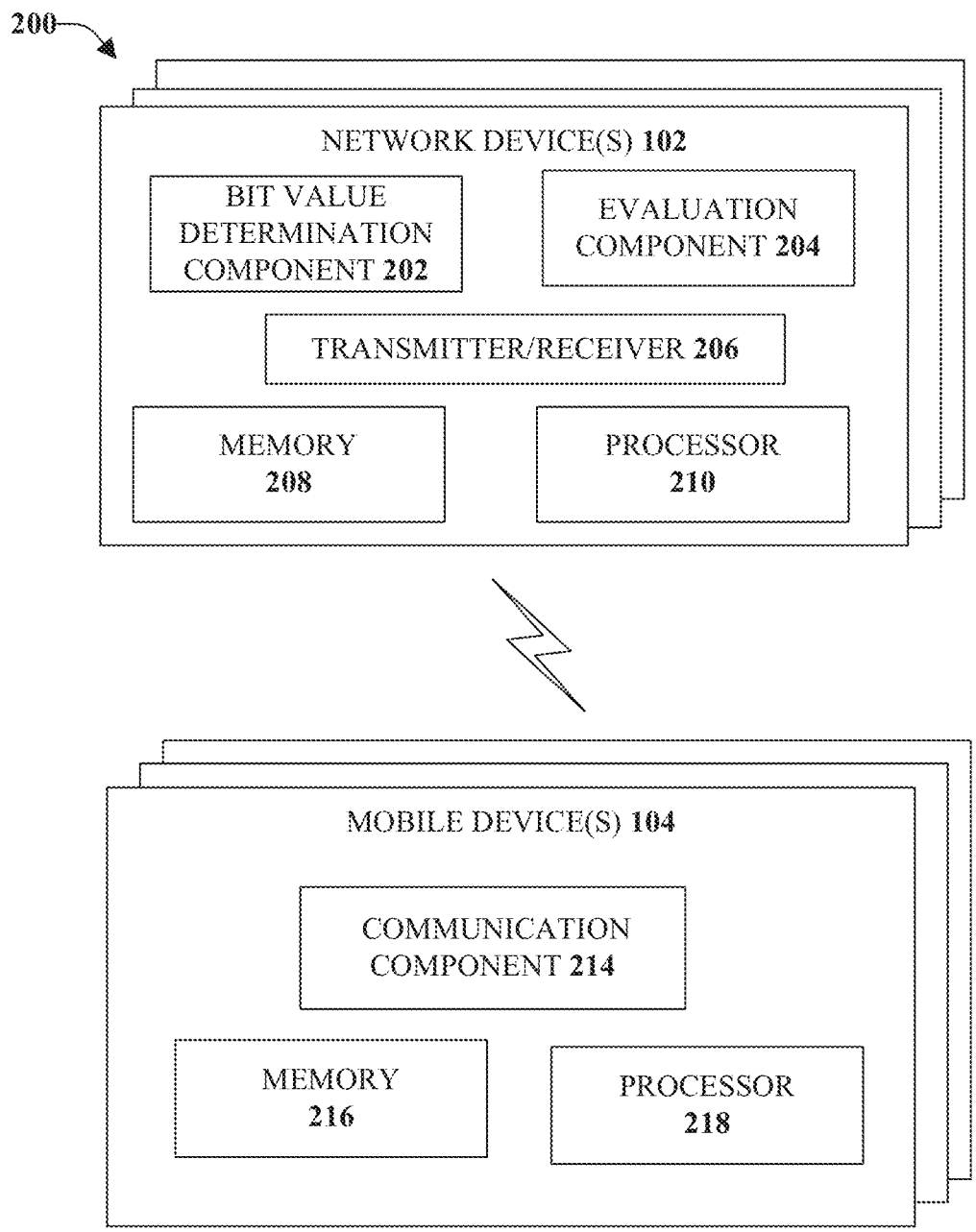
FIG. 2 illustrates an example, non-limiting, system for facilitating restriction of channel state information to improve communication coverage in accordance with one or more embodiments.

FIG. 2 illustrates an example, non-limiting, system 200 for facilitating restriction of channel state information to improve communication coverage in accordance with one or more embodiments. The various aspects discussed herein can facilitate improved coverage in a wireless communications system.

The system 200 can comprise one or more network devices (illustrated as the network device 102) and one or more user equipment or mobile devices (illustrated as the mobile device 104). The network device 102 can be included in a group of network devices of a wireless network. It is noted that although only a single mobile device and a single network device are illustrated, the system 200 can comprise a multitude of mobile devices and/or a multitude of network devices.

As an example, the mobile device 104 can report a number of bits (e.g., 4 bits, 5 bits, 6 bits, and so on) of CQI per each codeword as part of a CSI report. The network device 102 (e.g., the gNode B) has no control in the selection of CQI reported by the mobile device 104. For example, irrespective of the channel conditions, the CQI size in the uplink control channel is always fixed. However, in an example, if the mobile device is constantly reporting a low value of CQI (e.g., a MTC mobile device that is at near cell edge or in the coverage limited area) then for CSI reporting, the mobile device has to keep reporting the feedback channel with fixed allocation for CQI for each codeword. Therefore, the feedback channel transmission is not optimal as the energy spent on each bit is wasted even though the mobile device is reporting a low CQI value.

To mitigate the inefficiencies as discussed in the above example, the various aspects discussed herein can control the CQI reported by the mobile device 104. For example, the network device 102 can comprise a bit value determination component 202, an evaluation component 204, a transmitter/receiver 206, at least one memory 208, and at least one processor 210. Further, the mobile device 104 can comprise a communication component 214, at least one memory 216, and at least one processor 218.

The bit value determination component 202 can set a bit of a channel quality indicator subset restriction map to an active value (e.g., "1") or to a de-active value (e.g., "0") based on one or more criteria of the mobile device 104. The bit (or more than one bit) selected and activated by the bit value determination component 202 can be selected from two or more bits of the channel quality indicator subset restriction bitmap.

To determine the one or more bits to activate, an evaluation component 204 can obtain and analyze various criteria of the mobile device 104. For example, the evaluation component 204 can evaluation a location or position of the mobile device 104 within a coverage area associated with a communications network. Based on the location, the bit value determination component 202 can set the bit(s) or channel quality indicator indices corresponding to a quadrature phase shift keying.

In another example, the evaluation component 204 can determine a Doppler metric of the mobile device 104. If the Doppler metric does not satisfy a defined threshold (e.g., a defined speed), the bit value determination component 202 can set a first bit of the channel quality indicator bitmap. However, if the Doppler metric satisfied the defined threshold, the bit value determination component 202 can set a second bit of the channel quality indicator bitmap.

According to another example, the evaluation component 204 can determine a receiving capability of the mobile device 104. The receiving capacity can be based on a number of transmit antennas that can be decoded at the mobile device 104. If the receiving capability of the mobile device 104 is a two transmit antenna capability, the bit value determination component 202 can activate a first bit in the bit map. Alternatively, if the receiving capability of the mobile device 104 is a four transmit antenna capability, the bit value determination component 202 can activate a second bit in the bit map.

In still another example, the evaluation component 204 can determine a power headroom capability of the mobile device. If the mobile device has a power headroom capability that does not satisfy a defined power headroom level, the bit value determination component 202 can activate a first bit in the bit map. Alternatively, if the power headroom capability satisfied the defined power headroom level, the bit value determination component 202 can activate a second bit in the bit map.

It is noted that although the above example describe a first bit and a second bit, more than a single bit can be activated. For example, if the receiving capability of the mobile device 104 is a two transmit antenna capability, the bit value determination component 202 can activate three bits (or any other number of bits) in the bit map. Alternatively, if the receiving capability of the mobile device 104 is a four transmit antenna capability, the bit value determination component 202 can activate three bits (or any other number of bits) in the bit map. This can also apply to the other examples. Further, the bits activated in the alternative situations can be the same bit(s), different bit(s), or combinations thereof.

The transmitter/receiver 206 can send the bitmap to the mobile device 104, which can receive the bitmap via the communication component 214. According to an implementation, the transmitter/receiver 206 can send the bitmap using a higher layer signaling. According to another implementation, the transmitter/receiver 206 can send the bitmap using a physical layer signaling. The physical layer signaling can reduce a latency as compared to the higher layer signaling. In another implementation, the transmitter/receiver 206 can send the bitmap using implicit signaling.

By indicating to the mobile device a bit map, the mobile device can adaptively transmit a feedback channel by taking into consideration the CQI subset restriction (e.g., the activated bit(s)). For example, the feedback channel (uplink and/or downlink) can scale according to the bit pattern set by the network.

Accordingly, as discussed herein, the feedback channel structure can scale based on CQI subset restriction and, therefore, can transmit compact control channel information. Further, energy efficiency can be achieved at both the transmitter and the receiver. In addition, standardization efforts can be minimal and the nodes can reuse the feedback channels defined for various transmission modes. Further, the disclosed aspects can improve the throughput for both downlink and uplink due to the additional energy for traffic channels. Further, coverage can be improved with the disclosed aspects as discussed herein.

The respective one or more memories 208, 216 can be operatively coupled to the respective one or more processors 210, 218. The respective one or more memories 208, 216 can store protocols associated with facilitating restriction of channel state information as discussed herein. Further, the respective one or more memories 208, 216 can facilitate action to control communication between the network device 102 and the mobile device 104, such that the system 200 can employ stored protocols and/or algorithms to achieve improved communications in a wireless network as described herein.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 210, 218 can facilitate decoding bitmaps in a communication network. The processors 210, 218 can be processors dedicated to analyzing and/or generating information received, processors that control one or more components of the system 200, and/or processors that both analyze and generate information received and control one or more components of the system 200.

Further, the term network device (e.g., network node, network node device) is used herein to refer to any type of network node serving communications devices and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes (e.g., network device 102) can include but are not limited to: NodeB devices, base station (BS) devices, access point (AP) devices, TRPs, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

Figure 3:
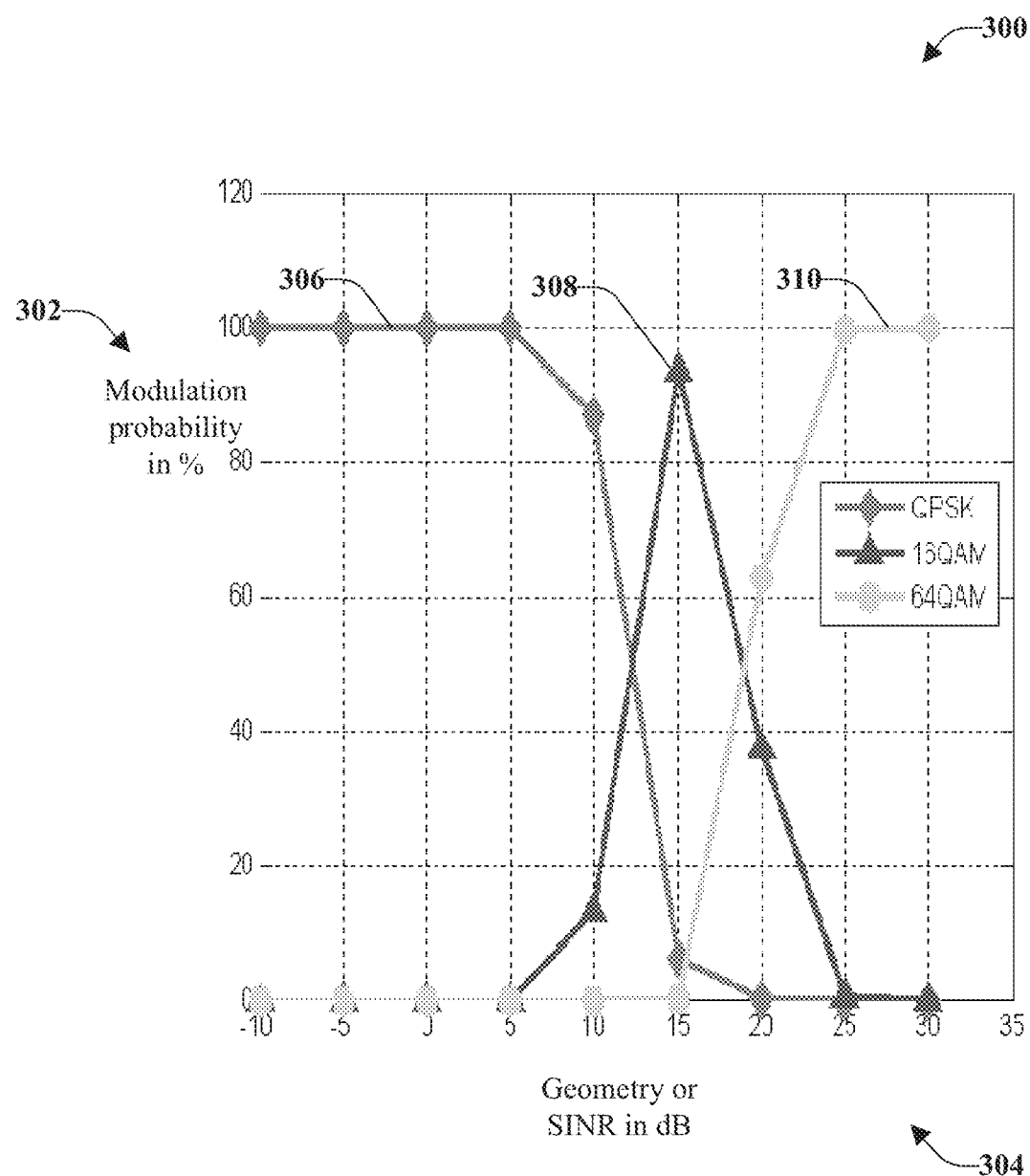
FIG. 3 illustrates an example, non-limiting, graphical representation of a modulation probability as a function of geometry for two transmit antennas in accordance with one or more embodiments.

FIG. 3 illustrates an example, non-limiting, graphical representation 300 of a modulation probability as a function of geometry for two transmit antennas in accordance with one or more embodiments. In the graphical representation, the modulation probability, expressed as a percentage, is illustrated on the vertical axis 302 and geometry or Signal to Interference plus Noise Ratio (SINR), expressed in decibels (dB), is illustrated on the horizontal axis 304.

The graphical representation 300 depicts the probability of choosing modulation (which can correspond to the CQI index) as a function of downlink geometry (or long term SINR) for a NR system with two transmit antennas. For link adaptation, the mobile device can choose a CQI index as shown in Table 1 below, which illustrates an example, non-limiting four-bit CQI Table.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In FIG. 3, QPSK is indicated by line 306, which is around one hundred percent at low geometries (e.g., −10 through 5). Therefore, with reference also to Table 1 above, at the low geometries, the probability of choosing QPSK modulation (hence a low CQI index) can be a very high probability. For example, see CQI indices 1-6 in Table 1. At medium geometries (e.g., 5 through 25) the probability of choosing CQI indices corresponding to the 16-QAM is higher, as indicated by line 308 in FIG. 3. For example, see CQI indices 7-9 in Table 1. Further, at high geometries (e.g., 25 and above), the probability of choosing CQI entries corresponding to the 64-QAM is even higher, as indicated by line 310. Accordingly, the various aspects can reduce the number of bits that are transmitted since all combinations are not necessary depending on the conditions.

Figure 4:
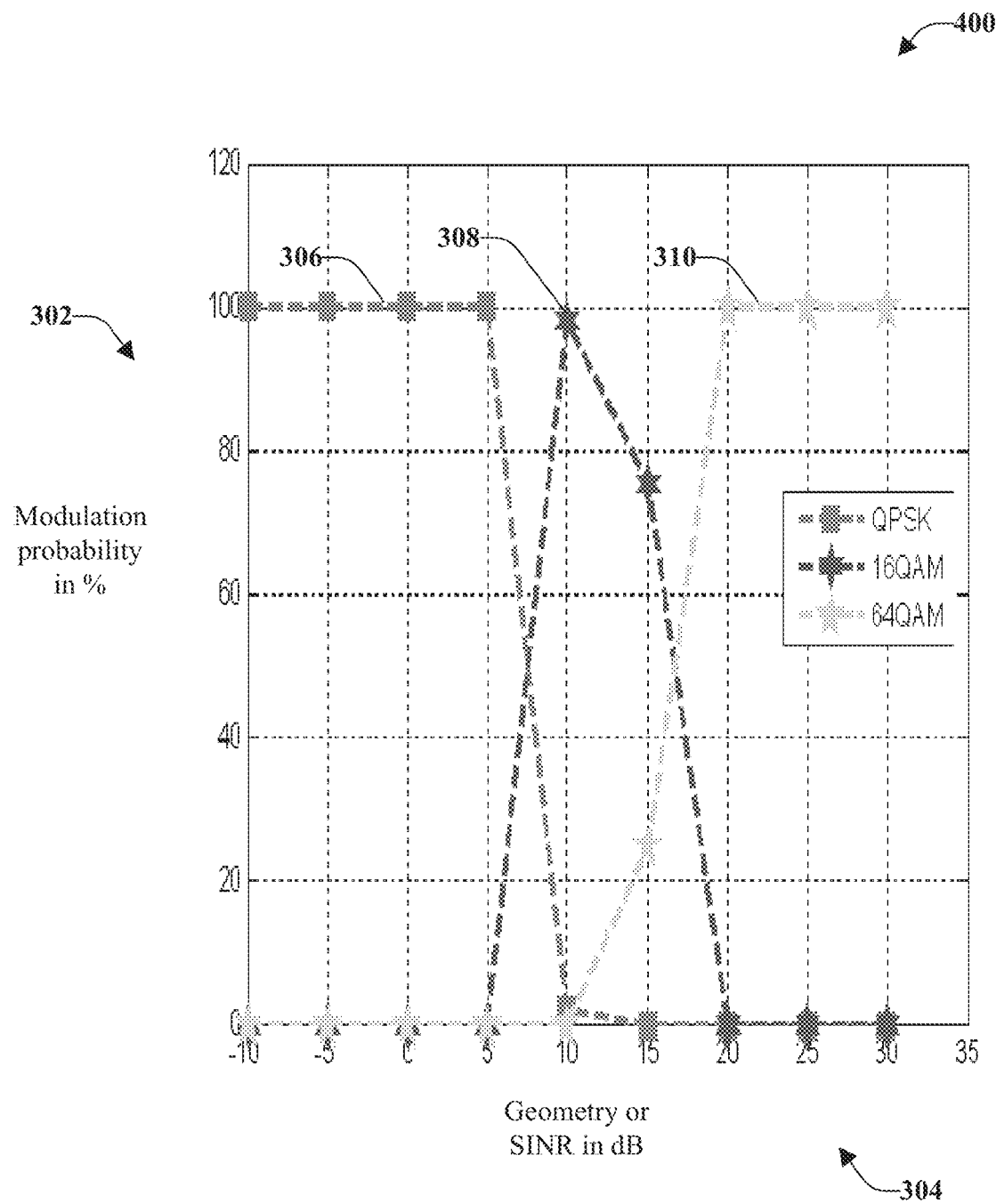
FIG. 4 illustrates an example, non-limiting, graphical representation of a modulation probability as a function of geometry for four transmit antennas in accordance with one or more embodiments described herein.

FIG. 4 illustrates an example, non-limiting, graphical representation 400 of a modulation probability as a function of geometry for four transmit antennas in accordance with one or more embodiments described herein. Repetitive description of like elements employed in other embodiments described herein is omitted for sake of brevity. The graphical representation 400 illustrates the probability of choosing modulation (which corresponds to the CQI index) as a function of downlink geometry (or (long term SINR) for NR system with four transmit antennas. Similar to the two transmit antenna case of FIG. 3, a comparable conclusion can be derived about the modulation probability versus geometry for the four transmit antenna case.

Based on the above results, and noting that the majority of mMTC massive Machine Type Communications) mobile devices are static (e.g., the CQI reported by the mMTC mobile devices is almost constant); the various aspects discussed herein can facilitate improved communications. For example, instead of using a feedback channel with four bits of CQI, the network device 102 can instruct (or restrict) the mobile device to choose only a subset of CQI indices (e.g., less than four bits of CQI). Therefore, the mobile device 104 can send a compact feedback for transmitting the CSI, which is referred to as CQI subset restriction.

As a first example, the network device 102 can set a bit map as shown in FIG. 5, which illustrates an example, non-limiting CQI subset restriction bit map 500 in accordance with one or more embodiments described herein. In this example, the network device 102 has set both CQI Index 1 and CQI Index 2 to "1," all others are set to "0." Therefore, the mobile device 104 can report CQI indices either 1 or 2 in its CSI report. Thus, the mobile device 104 utilizes only one bit to report CQI, thereby saving three bits as compared to prior forms of reporting.

Figure 6:
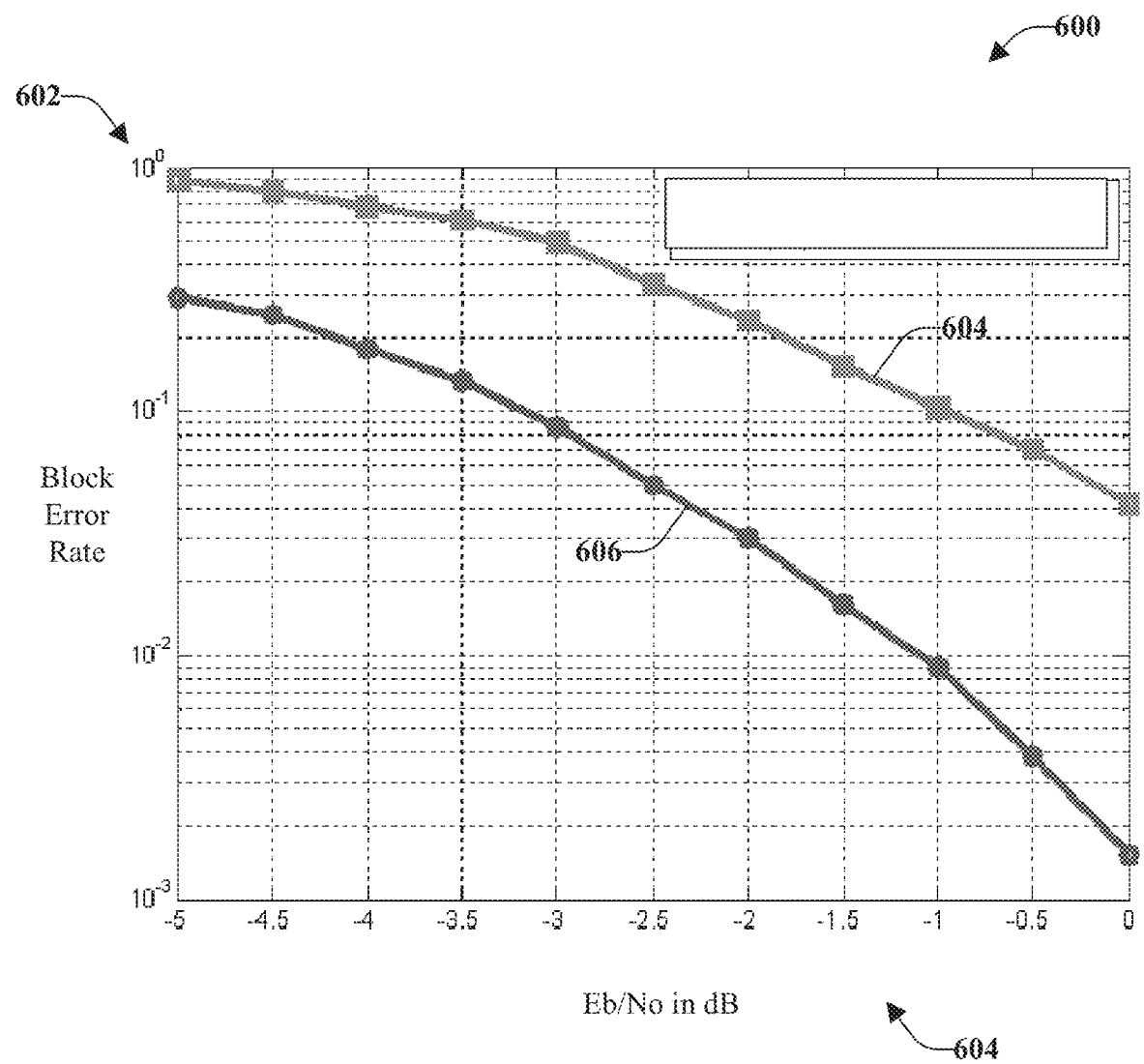
FIG. 6 illustrates an example, non-limiting, graphical representation of block error rate for the first example in accordance with one or more embodiments described herein.

The energy savings is depicted in FIG. 6, which illustrates an example, non-limiting, graphical representation 600 of block error rate for the first example in accordance with one or more embodiments described herein. The Block Error Rate (BLER) is a ratio of the number of erroneous blocks to the total number of blocks received. The BLER is depicted on the vertical axis 602 and the energy per bit to noise power spectral density ratio (Eb/No), expressed in decibels dB, is depicted on the horizontal axis 604. The $E_b/N_0$ is a parameter in digital communication or data transmission, which can be a normalized signal-to-noise ratio (SNR) measure (e.g., the "SNR per bit").

The energy savings illustrated in FIG. 6 is for Additive White Gaussian Noise (AWGN) channels, where the standard feedback (e.g., without using the disclosed aspects) is a channel transmitted after passing through (20, 8) block encoder. The standard feedback channel is illustrated by line 604. In accordance with the various aspects discussed herein, the feedback channel can be transmitted after passing through (20, 5) block encoder. The feedback channel discussed herein is illustrated by line 606. As illustrated in FIG. 6, the Eb/No savings are around 2.2 dB at BLER of 0.1. It is noted that the savings are more for fading channels.

In a second example, the network can set the bit map as shown in FIG. 7, which illustrates a CQI subset restriction bit map 700 for a second example in accordance with one or more embodiments described herein. In this example, only four entries are set. Specifically, CQI Index 1, CQI Index 2, CQI index 3, and CQI Index 7 are set to "1". Therefore, the CQI can be represented by two bits. This results in a savings of two bits in the CSI report, which conserves energy (power).

Figure 8:
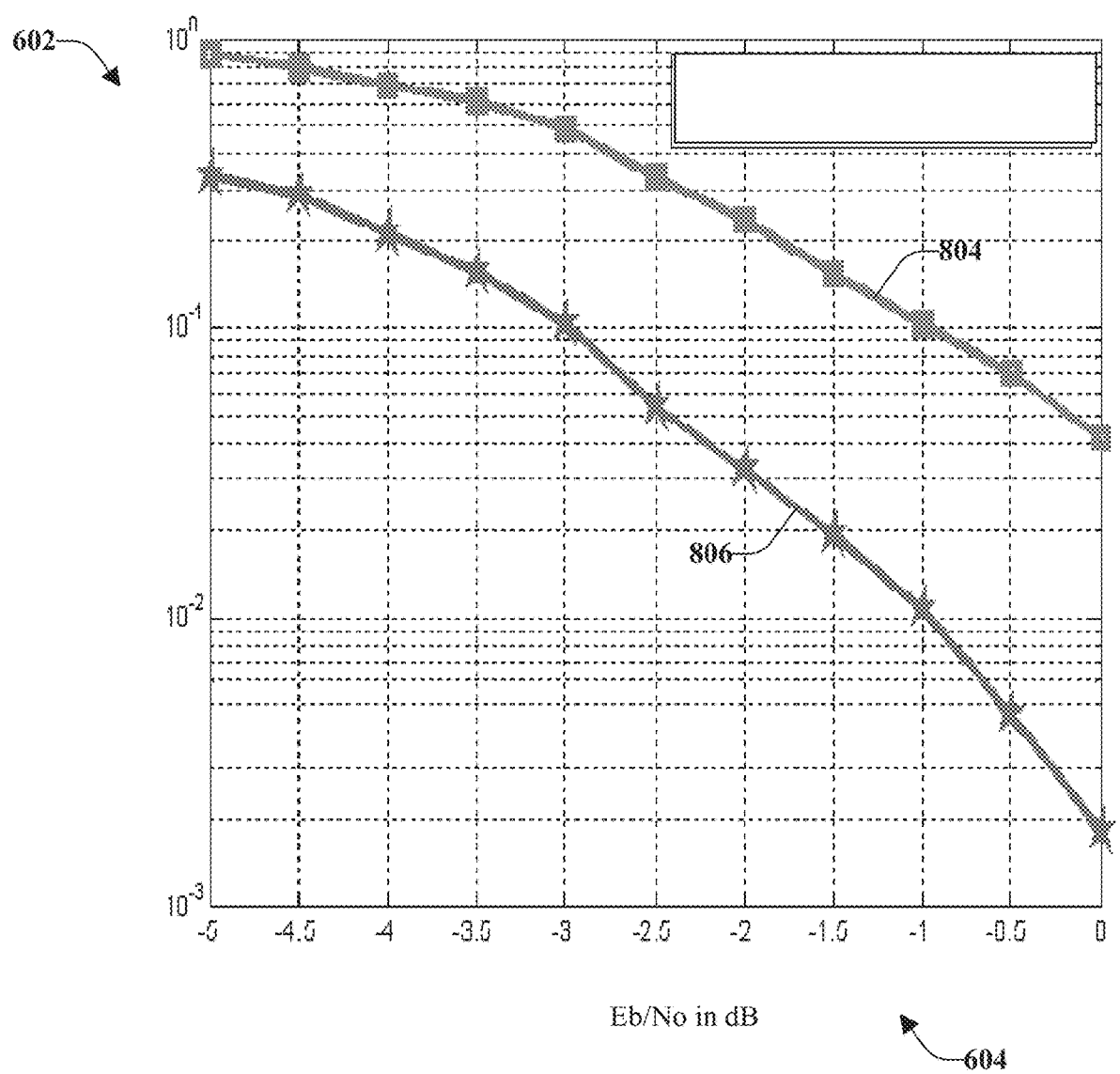
FIG. 8 illustrates an example, non-limiting, graphical representation for block error rate in accordance with the second example of FIG. 7 in accordance with one or more embodiments described herein.

The energy savings is depicted in FIG. 8, which illustrates an example, non-limiting, graphical representation 800 for block error rate in accordance with the second example of FIG. 7 in accordance with one or more embodiments described herein. FIG. 8 illustrates the energy savings for AWGN channels, where the standard feedback (e.g., without using the disclosed aspects) is the channel transmitted after passing through (20, 8) block encoder, as indicated by line 802. In accordance with one or more aspects discussed herein, the feedback channel can be transmitted after passing through (20, 6) block encoder, as indicated by line 804. As illustrated, the Eb/No savings are around 2.0 dB at BLER of 0.1. It is noted that the savings are more for fading channels.

In accordance with an embodiment, the network can inform the mobile device whether the mobile device should report four bit CQI, three bit CQI, two bit CQI, or one bit CQI. This is depicted in Table 2 below, which illustrates an example, non-limiting pre-configured table for CQI indices mapping.

TABLE 2

| Network node bit map | CQI indices | Number of bits needed for CQI |
|---|---|---|
| 00 | 0-15 | 4 |
| 01 | 0-1 or 2-3, . . . 14-15 | 1 |
| 10 | 0-3, 4-7. . . | 2 |
| 11 | 0-7, . . . | 3 |

As an example, if the network indicates "00", by using the mapping in Table 2, the network device indicated that a four bit CQI is preferred and should be used by the mobile device. In another example, if the network indicates "10", the mobile device can determine that the network device has indicated that the mobile device should report a two bit CQI. Further, although the example is for a two bit map from the network device, the bit map aspects can be extended to one bit, three bits, or other bits in accordance with various implementations.

According to some implementations, to set the bits in a CQI subset restriction bit map, the network device can use one or more criteria. For example, the network device can use a mobile device location within a coverage area associated with the cell (e.g., the wireless communications network) to set the bits. In another example, the network node can use a Doppler metric (e.g., a speed of movement) of the mobile device. In a further example, the network device can use a capability of the mobile device to set the bits. In yet another example, the network device can utilize the mobile device power headroom to set the bits. In some implementations, the network device can use a combination of two or more of the mobile device location, Doppler metric, capability, and power headroom to set the bits in the CQI subset restriction bit map. Details for these criteria will now be provided.

A criterion for determining which bits should be set can be to identify the location of the mobile device within a coverage area associated with the cell. For example when the mobile device is at the cell edge, the network device can set the indices corresponding to the QPSK. It is noted that there can be several methods to identify the mobile device location from the network device (e.g., eNode B). In an example, GPS measurements can be utilized. In another example, the reported CQIs (before CQI subset restriction is applied) can be utilized. In yet another example, the mobility measurement reports can be utilized. However, other manners of determining the mobile device location can also be utilized. In addition, the size of the Neighbor Cell List (NCL) can be an indication whether the mobile device is at the cell center or is not at the cell center.

The Doppler metric (Dm) or speed of the mobile device can be used as a metric for setting up the CQI subset restriction bit map. For example, if the Doppler metric is less than a defined threshold, then specific bits are set. For high Doppler case (e.g., the Doppler metric is more than a defined threshold), it could be better to set the wide set of bits.

There can be various manners of computing the Doppler metric. For example direct speed measurement and/or rate of change of uplink channel estimates can be used. For the direct speed measurement, the network device can compute the direct speed of the mobile device (e.g., by positioning or GPS at multiple intervals). Then the Doppler metric can be taken as an average of the individual speed measurement. For the rate of change of uplink channel estimates, the network device can estimate the uplink channel. The rate of change of uplink channel can provide a measure of Doppler metric.

For the mobile device capability, with reference again to FIGS. 3 and 4, thresholds for choosing 16 QAM and 64 QAM are different. For example for the two transmit antenna case (FIG. 3), at a geometry of 10 dB the majority of modulation can be dominated by CQI indices corresponding to QPSK. For the four transmit antenna case (FIG. 4), the modulation can be dominated by 16-QAM. Therefore, based on the mobile device capability of receiving either two transmit antennas or four transmit antennas, the specific bits in the CQI subset restriction can be set.

For the power headroom of the mobile device, with reference again to FIGS. 6 and 8, by using compact feedback channels, transmit power of the mobile device can be conserved. Therefore, a criterion for setting up the CQI subset restriction bit map can be to take the mobile device power headroom into account. For example if the power headroom is below a certain threshold, then the network device can decide to set CQI subset restriction bits to a few bits. It is noted that the network device can be explicitly and/or implicitly informed of the power headroom information by the mobile device.

Further, as previously mentioned, a single criterion (discussed above) can be utilized to determine which bits to set in the CQI subset restriction map. However, according to some implementations, a combination of two or more of the above described criteria can be utilized to determine which bits to set in the CQI subset restriction map.

Upon or after the network node device determines which bits should be set in the CQI subset restriction bit map, the network node device can communicate the bitmap to the mobile device. Various manners of communicating the bit map can be utilized including, for example, using higher layer signaling, using physical layer signaling, and using implicit signaling, which will be described in further detail with respect to the following figures.

Figure 9:
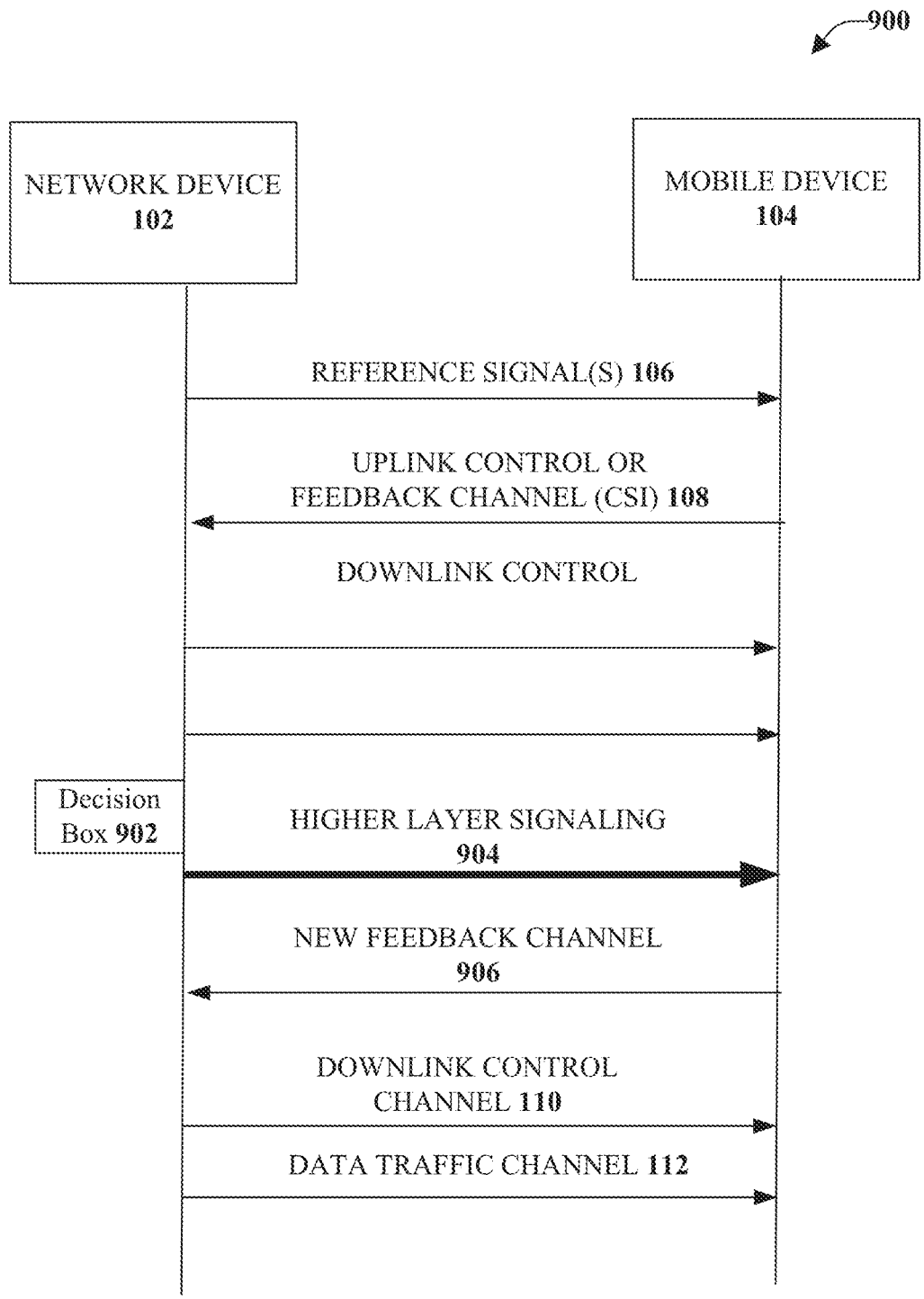
FIG. 9 illustrates an example, non-limiting message sequence chart for communicating the bitmap with higher layer signaling in accordance with one or more embodiments described herein.

FIG. 9 illustrates an example, non-limiting message sequence chart 900 for communicating the bitmap with higher layer signaling in accordance with one or more embodiments described herein. Repetitive description of like elements employed in other embodiments described herein is omitted for sake of brevity.

In this example, it can be assumed that the network device 102 is receiving the CSI using a standard feedback channel 108 (e.g., without using the disclosed aspects). The network device 102 can periodically check the selection criteria as discussed above (e.g., location, Doppler metric, capability, and/or power headroom of the mobile device 104). The network device 102 can make a decision 902 based on the result of the selection criteria (e.g., if the result is acceptable), the network device 102 can send a higher order signaling 904 to the mobile device 104. The mobile device 104 can send a CSI according to the bits set in the CQI subset restriction and can use a compact feedback channel 906.

Figure 10:
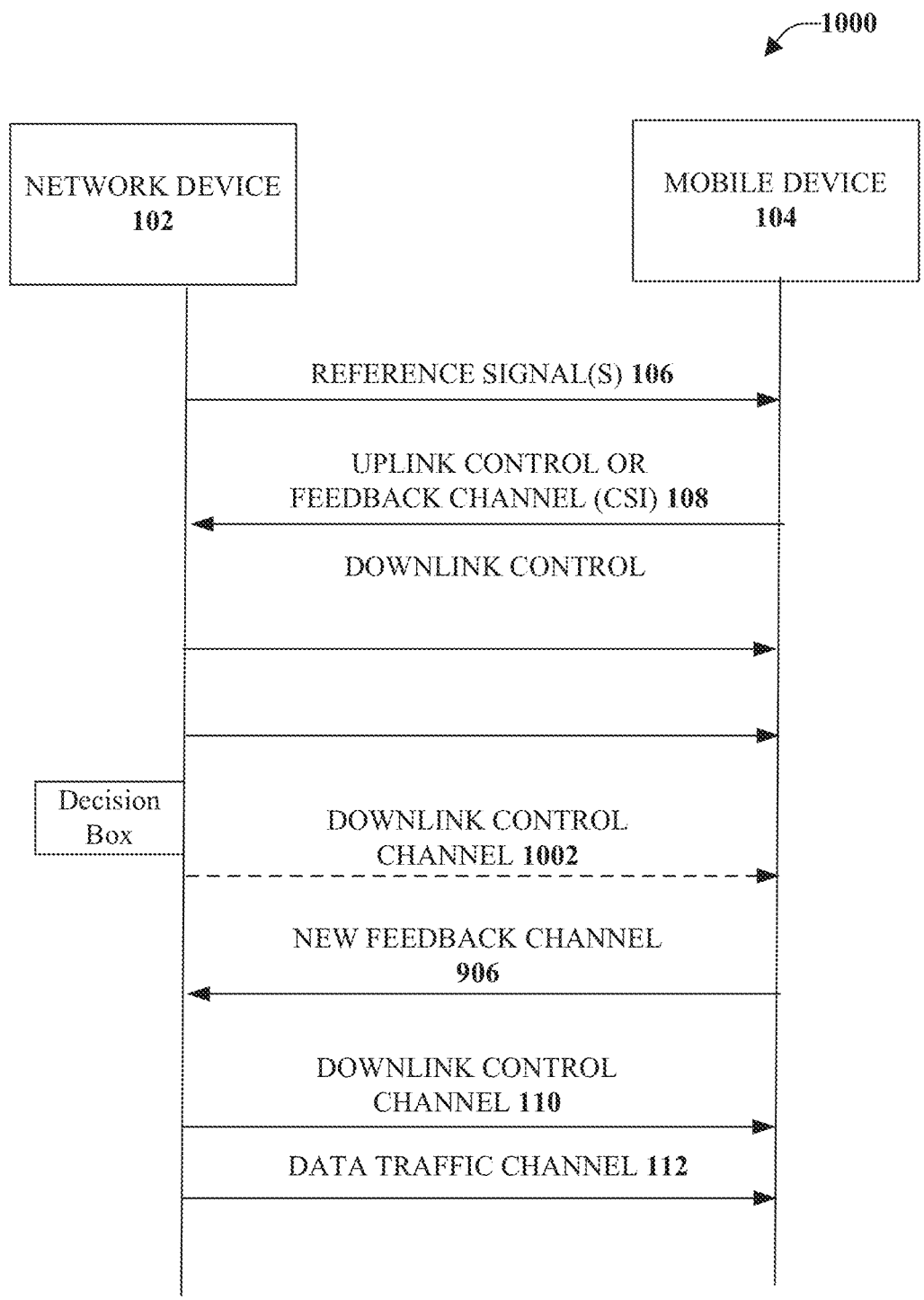
FIG. 10 illustrates an example, non-limiting method sequence chart with physical layer signaling to communicate the channel quality indicator subset restriction bit map in accordance with one or more embodiments described herein.

FIG. 10 illustrates an example, non-limiting, method sequence chart 1000 with physical layer signaling to communicate the channel quality indicator subset restriction bit map in accordance with one or more embodiments described herein. Repetitive description of like elements employed in other embodiments described herein is omitted for sake of brevity.

As illustrated, the network node device (e.g., gNode B/Node B) can send the CQI subset restriction bitmap using physical layer signaling. This method sequence chart 1000 can be useful as it reduces the latency compared to the higher layer signaling.

For FIG. 10, it can be assumed that initially the mobile device sends the feedback channel using the standard feedback channel 108 (e.g., without using the disclosed aspects). After few TTIs, the network node device can check the criterion. If the criterion is a pass then the network node device can send the signaling through downlink control channel (or a new L1 channel) to change the feedback channel configuration. This message can be sent using a separate field in the downlink control channel 1002 according to an implementation. Alternatively, this message can be sent using an unused combination in the downlink control channel.

According to some implementations, the CQI subset restriction can be set implicitly. For example if the mobile device indicates it is of a certain mobile device category, then the network can configure the mobile device with certain CQI subset restriction without informing the mobile device with a particular bitmap during the cell setup.

According to various aspects, the mobile device can transmit control information with CQI subset restriction. Upon or after the network node device sends the CQI subset restriction bit map, the mobile device can re-map the CQI elements. This will be explained by the following example, where the network node device sends the bit map 1100 of FIG. 11 to the mobile device. In this example, CQI Index 1, CQI Index 2, CQI Index 8, and CQI Index 11 are set to "1.".

When a bit is set equal to "1," the mobile device should use the CQI corresponding to this index. Therefore, the mobile device can remap the indices as indicated in Table 3 below.

TABLE 3

| | CQI index | | | |
|---|---|---|---|---|
| | 0 | 1 | 2 | 3 |
| CQI corresponding to the original | 1 | 2 | 8 | 11 |

The mobile device can map the CQI indices upon or after the mobile device receives the CQI subset restriction bit map. Further, the network node device can also understand this mapping. Thus, if the mobile device reports CQI index 2, based on Table 3 above, the mobile device is actually referring to CQI index 8 in the original CQI table (e.g., the bit map 1100 of FIG. 11). In another example, if the mobile device reports CQI index 1, based on Table 3 above, the mobile device is referring to CQI index 2 in the original CQI table (e.g., the bit map 1100 of FIG. 11). After the mobile device maps the CQI indices, the mobile device can use the feedback channel corresponding to the new CQI indices. Thus, only two bits are necessary in this example.

Figure 12:
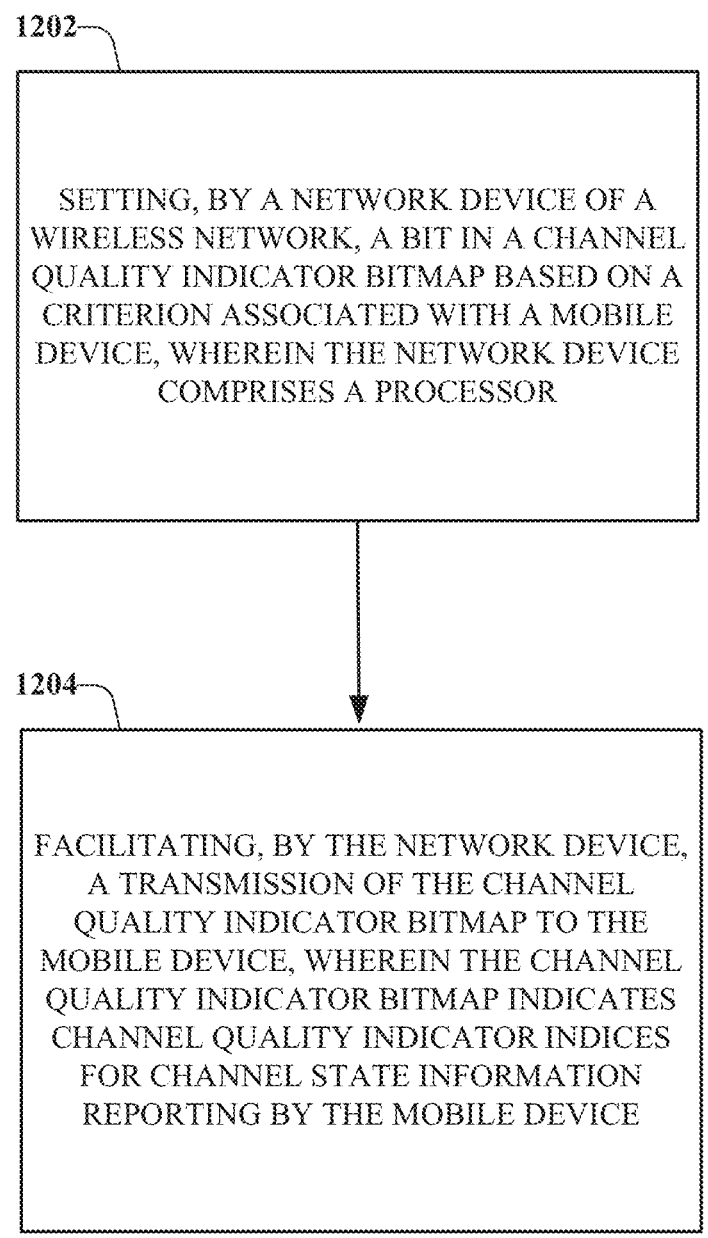
FIG. 12 illustrates an example, non-limiting, method for facilitating restriction of channel state information to improve communication coverage in accordance with one or more embodiments described herein.

FIG. 12 illustrates an example, non-limiting, method 1200 for facilitating restriction of channel state information to improve communication coverage in accordance with one or more embodiments described herein. The method 1200 can be implemented by a network device of a wireless network. The network device can comprise a processor. Alternatively or additionally, a machine-readable storage medium can comprise executable instruction that, when executed by a processor, facilitate performance of operations for the method 1200.

The method 1200 starts, at 1202, when a bit in a channel quality indicator bitmap is set based on a criterion associated with a mobile device. For example, the criterion associated with the mobile device can be a location of the mobile device within a coverage area associated with the wireless network. Further to this example, setting the bit in the channel quality indicator bitmap can comprise determining the location of the mobile device in the wireless network and setting the channel quality indicator indices corresponding to a quadrature phase shift keying.

In another example, the criterion associated with the mobile device can be a Doppler metric of the mobile device. Further to this example, a first bit of the channel quality indicator bitmap can be set based on a first determination that the Doppler metric does not satisfy a defined threshold. Alternatively, a second bit can be set in the channel quality indicator bitmap based on a second determination that the Doppler metric satisfies the defined threshold.

According to another example, the criterion associated with the mobile device can be a capacity of the mobile device. Setting the bit in the channel quality indicator bitmap can comprise determining a receiving capability of the mobile device based on a number of transmit antennas. A first bit in the channel quality indicator bitmap can be set based on a first determination that the receiving capability of the mobile device is a two transmit antenna capability. Alternatively, a second bit in the channel quality indicator bitmap can be set based on a second determination that the receiving capability of the mobile device is a four transmit antenna capability.

In another example, the criterion associated with the mobile device can be a power headroom of the mobile device. Setting the bit in the channel quality indicator bitmap can comprise setting a first bit in the channel quality indicator bitmap based on a first determination that the power headroom capability of the mobile device does not satisfy a defined power headroom level. Alternatively, setting the bit can comprise setting a second bit in the channel quality indicator bitmap based on a second determination that the power headroom capability of the mobile device satisfies the defined power headroom level.

At 1204, facilitate a transmission of the channel quality indicator bitmap to the mobile device. The channel quality indicator bitmap indicates channel quality indicator indices for channel state information reporting by the mobile device. The channel quality indicator bitmap can be transmitted using a higher layer signaling. In another implementation, the channel quality indicator can be transmitted using a physical layer signaling. The physical layer signaling can reduce a latency as compared to a higher layer signaling. In another implementation, the channel quality indicator can be transmitted using implicit signaling.

Described herein are systems, methods, articles of manufacture, and other embodiments or implementations that can facilitate restriction of channel state information to improve communication coverage in a 5G network. Facilitating restriction of channel state information in a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 13:
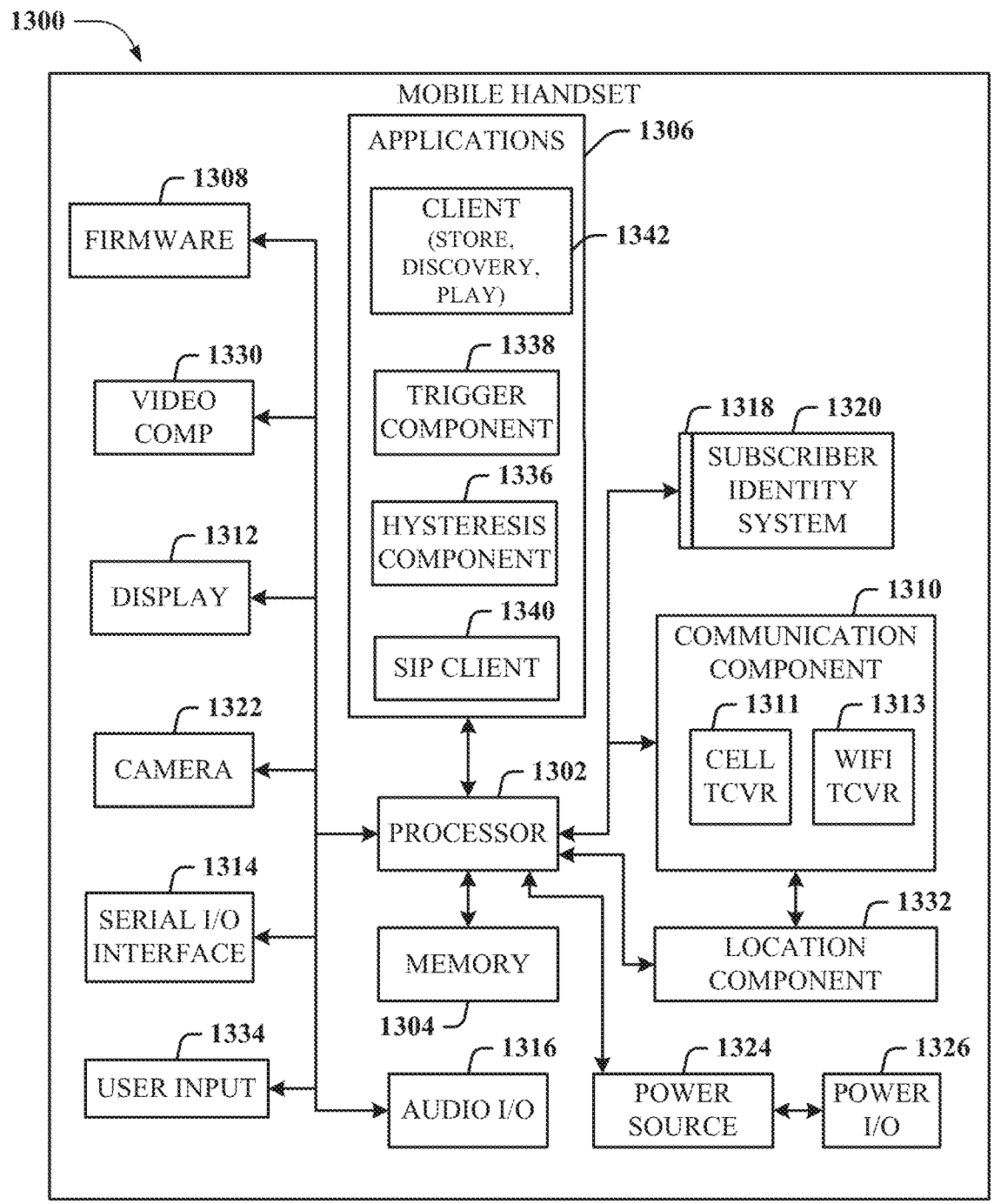
FIG. 13 illustrates an example block diagram of an example mobile handset operable to engage in a system architecture that facilitates wireless communications according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1410 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
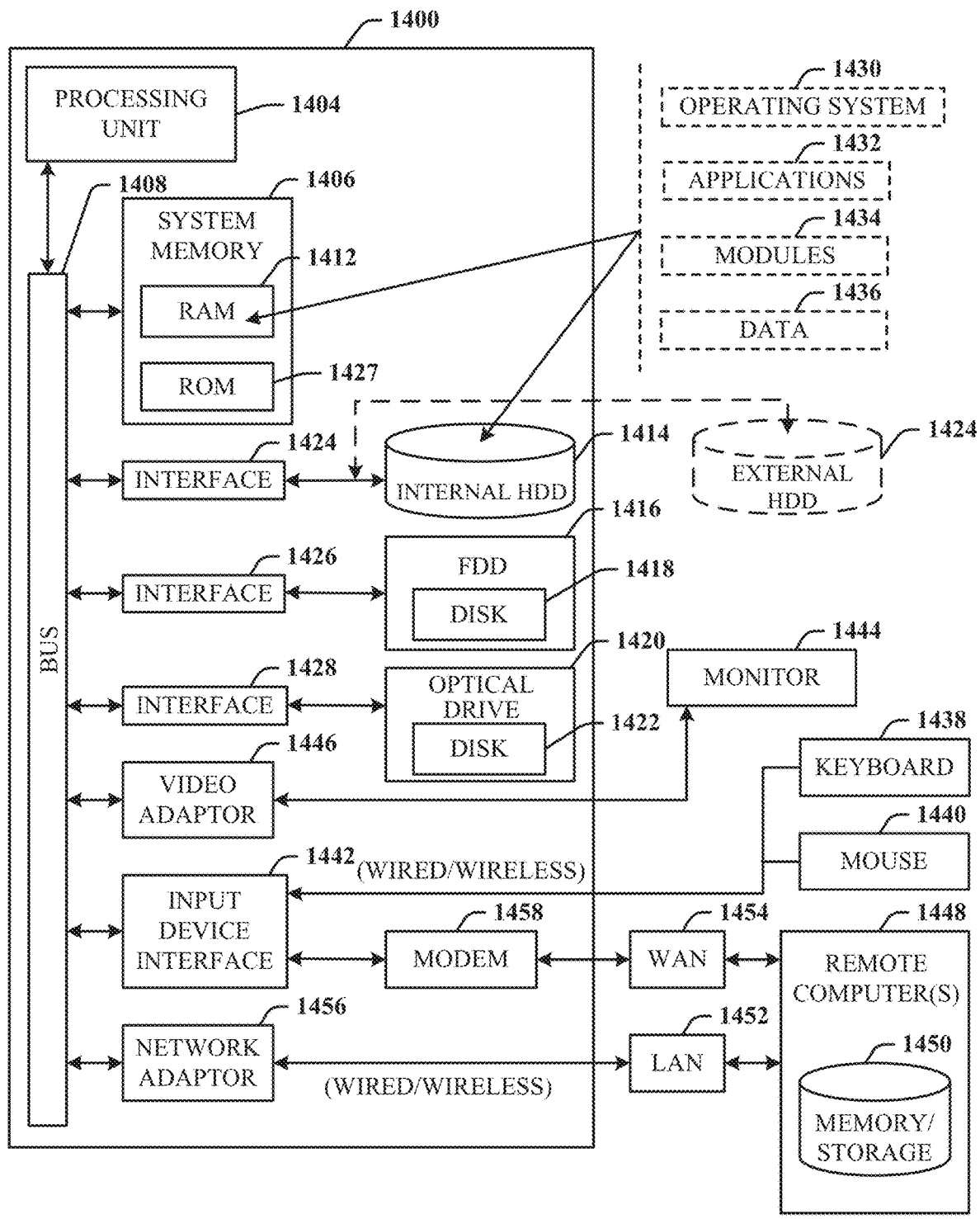
FIG. 14 illustrates an example block diagram of an example computer operable to engage in a system architecture that facilitates wireless communications according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein with regards to the end-user device can include a computer 1400, the computer 1400 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems.

A user can enter commands and information into the computer 1400 through one or more wired/wireless input devices, e.g., a keyboard 1438 and a pointing device, such as a mouse 1440. Other input devices (not shown) can include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 through an interface, such as a video adapter 1446. In addition to the monitor 1444, a computer 1400 typically includes other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1400 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the remote memory/storage device 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not taken into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a processor; and
    a memory that stores executable instructions that, when executed by the processor, facilitate performance of operations, comprising:
        setting a first bit and a second bit of a channel quality indicator bitmap separately as a function of a performance criterion of a mobile device, wherein the first bit and the second bit are selected from a group of bits of the channel quality indicator bitmap, and wherein the performance criterion is at least one criteria of a group of criteria comprising a defined threshold of a Doppler metric of the mobile device, a receiving capability of the mobile device based on a number of transmit antennas being more than two transmit antennas, and a defined power headroom level of a power headroom capability of the mobile device; and
        sending the channel quality indicator bitmap to the mobile device, wherein any one of the first bit and the second bit restrict a selection by the mobile device to defined channel quality indicator indices and reduces a number of bits that represent the defined channel quality indicator indices.

2. The system of claim 1, wherein the operations further comprise selecting the first bit and the second bit from the group of bits of the channel quality indicator bitmap based on a determination of reporting channel quality indicator indices for use by the mobile device for channel state information reporting.

3. The system of claim 1, wherein the operations further comprise:
    determining a location of the mobile device within a coverage area associated with a wireless network; and
    using the location of the mobile device to set the defined channel quality indicator indices corresponding to quadrature phase shift keying.

4. The system of claim 1, wherein the operations further comprise:
    determining the Doppler metric of the mobile device, and wherein the setting the first bit and the second bit comprises setting the first bit of the channel quality indicator bitmap based on a first determination that the Doppler metric does not satisfy the defined threshold, and setting the second bit of the channel quality indicator bitmap based on a second determination that the Doppler metric satisfies the defined threshold.

5. The system of claim 1, wherein the operations further comprise:
    determining the receiving capability of the mobile device based on the number of transmit antennas, and wherein the setting the first bit and the second bit comprises setting the first bit of the channel quality indicator bitmap based on a first determination that the receiving capability of the mobile device is a two transmit antenna capability, and setting the second bit of the channel quality indicator bitmap based on a second determination that the receiving capability of the mobile device is a four transmit antenna capability.

6. The system of claim 1, wherein the operations further comprise:
    determining the power headroom capability of the mobile device, and wherein the setting the first bit and the second bit comprises setting the first bit of the channel quality indicator bitmap based on a first determination that the power headroom capability of the mobile device does not satisfy the defined power headroom level, and setting the second bit of the channel quality indicator bitmap based on a second determination that the power headroom capability of the mobile device does satisfy the defined power headroom level.

7. The system of claim 1, wherein the sending the channel quality indicator bitmap to the mobile device comprises sending the channel quality indicator bitmap via a downlink control channel configured to operate according to a fifth generation wireless communication network protocol.

8. A method, comprising:

independently setting, by a network device of a wireless network, a first bit and a second bit in a channel quality indicator bitmap based on a criterion associated with a mobile device, wherein the network device comprises a processor, and wherein the criterion is at least one criterion of a group of criteria, the group of criteria comprising a defined threshold of a Doppler metric, a receiving capability being at least a two transmit antenna capability, and a power headroom capability of the mobile device compared to a defined power headroom level; and facilitating, by the network device, a transmission of the channel quality indicator bitmap to the mobile device, wherein the channel quality indicator bitmap indicates channel quality indicator indices for channel state information reporting by the mobile device.

9. The method of claim 8, wherein the criterion associated with the mobile device is a location of the mobile device in the wireless network, and wherein the setting the first bit and the second bit comprises:

determining the location of the mobile device in the wireless network; and setting the channel quality indicator indices corresponding to a quadrature phase shift keying.

10. The method of claim 8, wherein the setting the first bit and the second bit in the channel quality indicator bitmap comprises:

determining the Doppler metric of the mobile device;

setting the first bit of the channel quality indicator bitmap based on a first determination that the Doppler metric does not satisfy a defined threshold, and setting the second bit in the channel quality indicator bitmap based on a second determination that the Doppler metric satisfies the defined threshold.

11. The method of claim 8, wherein the setting the first bit and the second bit comprises:

determining the receiving capability of the mobile device based on a number of transmit antennas;

setting the first bit in the channel quality indicator bitmap based on a first determination that the receiving capability of the mobile device is a two transmit antenna capability; and setting the second bit in the channel quality indicator bitmap based on a second determination that the receiving capability of the mobile device is a four transmit antenna capability.

12. The method of claim 8, wherein the setting the first bit and the second bit comprises:

determining the power headroom capability of the mobile device;

setting the first bit in the channel quality indicator bitmap based on a first determination that the power headroom capability of the mobile device does not satisfy the defined power headroom level; and setting the second bit in the channel quality indicator bitmap based on a second determination that the power headroom capability of the mobile device satisfies the defined power headroom level.

13. The method of claim 8, wherein the facilitating the transmission of the channel quality indicator bitmap to the mobile device comprises facilitating the transmission of the channel quality indicator bitmap using a higher layer signaling.

14. The method of claim 8, wherein the facilitating the transmission of the channel quality indicator bitmap to the mobile device comprises facilitating the transmission of the channel quality indicator bitmap using a physical layer signaling, and wherein the physical layer signaling reduces a latency as compared to a higher layer signaling.

15. The method of claim 8, wherein the facilitating the transmission of the channel quality indicator bitmap to the mobile device comprises facilitating the transmission of the channel quality indicator bitmap using implicit signaling.

16. The method of claim 8, wherein the channel quality indicator indices indicate, to the mobile device, a number of bits to be used by the mobile device to report the channel quality indicator indices.

17. The method of claim 8, wherein the setting the first bit and the second bit in the channel quality indicator bitmap comprises scaling a feedback channel structure based on a channel quality indicator subset restriction.

18. The method of claim 17, wherein the transmission is a first transmission, and wherein the scaling the feedback channel structure comprises facilitating a second transmission of compact control channel information.

19. A non-transitory machine-readable medium, comprising executable instructions that, when executed by a processor, facilitate performance of operations, comprising:

determining, based on a criterion of a mobile device, a first bit and a second bit within a modulation coding scheme bitmap to activate, wherein the first bit and the second bit are selected from at least three bits within the modulation coding scheme bitmap, and wherein the criterion is one of a defined threshold of a Doppler metric of the mobile device, a receiving capability of the mobile device based on a transmit antenna capability being a two transmit antenna capability or a four transmit antenna capability, and a defined power headroom level of a power headroom capability of the mobile device; and sending, to the mobile device, the modulation coding scheme bitmap with one of the first bit or the second bit activated, wherein a selection of either the first bit or the second bit being activated specifies modulation coding scheme indices to be used by the mobile device to report channel state information.

20. The non-transitory machine-readable medium of claim 19, wherein the sending the modulation coding scheme bitmap comprises sending the modulation coding scheme bitmap via a downlink control channel configured to operate according to a defined radio access network protocol.

* * * * *